(12) United States Patent
Hart et al.

(10) Patent No.: US 11,055,381 B1
(45) Date of Patent: Jul. 6, 2021

(54) ESTIMATING PRODUCT INTEGRALS USING A COMPOSITION OF WARPS

(71) Applicant: NVIDIA Corporation, Santa Clara, CA (US)

(72) Inventors: David Augustus Hart, Salt Lake City, UT (US); Matthew Milton Pharr, Oakland, CA (US); Thomas Müller, Rheinfelden (DE); Ward Lopes, Redwood City, CA (US); Morgan McGuire, Williamstown, MA (US); Peter Schuyler Shirley, Salt Lake City, UT (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/900,046

(22) Filed: Jun. 12, 2020

(51) Int. Cl.
*G06T 11/00* (2006.01)
*G06F 17/17* (2006.01)
*G06T 3/00* (2006.01)
*G06N 3/08* (2006.01)
*G06N 3/04* (2006.01)

(52) U.S. Cl.
CPC .............. *G06F 17/17* (2013.01); *G06N 3/04* (2013.01); *G06N 3/08* (2013.01); *G06T 3/0093* (2013.01); *G06T 11/00* (2013.01)

(58) Field of Classification Search
None
See application file for complete search history.

(56) References Cited

U.S. PATENT DOCUMENTS

2008/0150938 A1* 6/2008 Pantaleoni .............. G06T 15/50
345/419

OTHER PUBLICATIONS

Zhang et al., GPU-based implementation of finite element method for elasticity using CUDA , Dec. 2013, IEEE, 1003-1008 (Year: 2013).*
Bilgic et al., Efficient Integral Image Computation on the GPU , Jun. 24, 2010, 528-533 (Year: 2010).*
Bridges et al., Understanding GPU Power: A Survey of Profiling, Modeling, and Simulation Methods, Sep. 2016 ACM, 41:1-41:27 (Year: 2016).*

* cited by examiner

*Primary Examiner* — Robert J Craddock
(74) *Attorney, Agent, or Firm* — Leydig, Voit & Mayer, Ltd.

(57) ABSTRACT

Sampling a function is used for many applications, such as rendering images. The challenge is how to select the best samples to minimize computations and produce accurate results. An alternative is to use a larger number of samples that may not be carefully selected in an attempt to increase accuracy. For a function that is an integral, such as functions used to render images, a sample distribution may be computed by inverting the integral. Unfortunately, for many integrals, it is neither easy nor practical to compute the inverted integral. Instead, warp functions may be combined to provide a sample distribution that accurately approximates the factors of the product being integrated. Each warp function approximates an inverted term of the product while accounting for the effects of warp functions approximating other factors in the product. The selected warp functions are customized or "fitted" to implement importance sampling for the approximated product.

20 Claims, 14 Drawing Sheets

Region 110
Image 115
Samples 112
Samples mapped into function space 114
$P^{-1}(\mathbf{u})$

ESTIMATING PRODUCT INTEGRALS USING A COMPOSITION OF WARPS

TECHNICAL FIELD

The present disclosure relates to estimating product integrals, and more particularly to estimating product integrals using a composition of warps.

BACKGROUND

Sampling a function is used for many applications, such as rendering images. The challenge is how to select the best samples to minimize the number of samples that are processed and produce accurate results. An alternative is to use a larger number of samples that may not be carefully selected in an attempt to increase the accuracy. For a function that is an integral, a sample distribution may be computed by inverting the integral. The conventional approach for inverting the integral can be referred to as "the inversion method." Unfortunately, for many integrals, it is neither easy nor practical to compute the inverted integral using the inversion method. There is a need for addressing these issues and/or other issues associated with the prior art.

SUMMARY

A method, computer readable medium, and system are disclosed for sampling an integral product using a composition of warps. The sampling technique may be used to sample an integral product for rendering images. For a function that is an integral product, such as the rendering equation, a sample distribution may be computed using by combining warp functions to provide a sample distribution that accurately approximates factors of the product being integrated. Each warp function approximates an inversion function. The selected warp functions are customized or "fitted" to implement importance sampling for the approximated product.

A first warp function approximating a first factor of a product integral and a second warp function approximating a second factor of the product integral are selected. Parameters of the first warp function are fitted to the second warp function to produce a fitted first warp function. The fitted first warp function and the second warp function are combined to produce a sample distribution and the sample distribution is applied to a product of the first factor and the second factor to approximate the product integral.

DETAILED DESCRIPTION

When an integral function is difficult to evaluate, such as when a closed form solution cannot be computed, Monte Carlo integration may be used to approximately integrate the function using random numbers. More specifically, the integral of a function $f(x)$ may be approximated by a sum of sample values at locations $x_i$ corresponding to N random numbers.

$$\int_{[0,1]^n} f(x)dx \approx \frac{1}{N}\sum_{i=1}^{N} f(x_i) \qquad \text{Eq. (1)}$$

The function is evaluated at each sample location $x_i=(u_1, u_2, u_n)$, for n-dimensional uniform points $u_i \in [0,1)$. The accuracy of the integral approximation increases as the number of samples, N, within the range [0,1) increases.

Figure 1A:
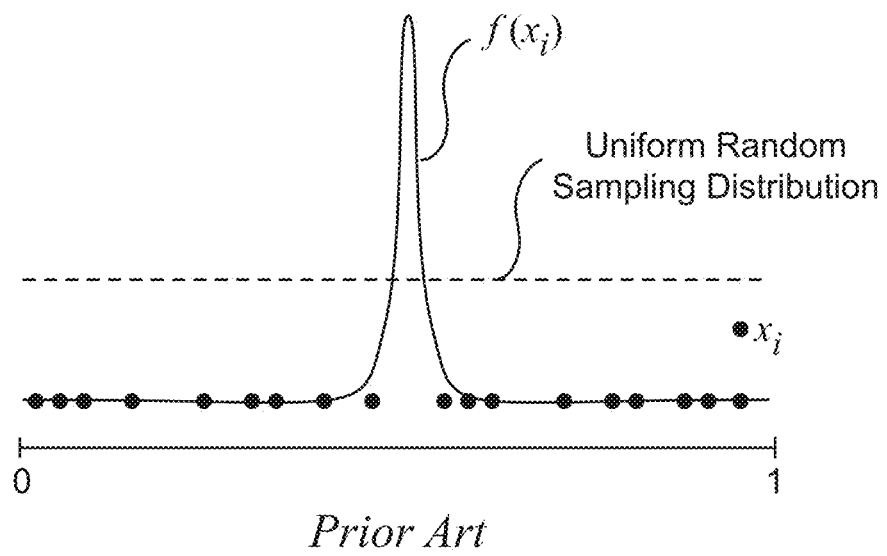
FIG. 1A illustrates a uniform randomly sampled function.

FIG. 1A illustrates a uniform randomly sampled function $f(x_i)$. A uniform random sampling distribution is used to sample the function so that every sample has equal probability of being selected. Each filled circle represents a location $x_i$ where the function is sampled. To most accurately integrate the function $\theta(x_i)$, a uniform random sampling function should have a distribution of samples that matches the function $\theta(x_i)$. In other words, more samples should exist where the values (on the y-axis) of $\theta(x_i)$ are highest, such as near the peak centered between x=0 and x=1. As shown in FIG. 1A, the uniform random sampling distribution provides a uniform distribution of random sample locations $x_i$. However, many sample locations are outside of the peak of the function, so the result (i.e., estimate of the integrated function) will have some error.

Differences or errors between the integrated function and the estimation computed using Monte Carlo approximation are referred to as variance. The variance may be reduced by using a conventional technique of importance sampling. Instead of taking N uniform random samples, the number of samples is increased in the portions of the function that contribute the most to the final result. Specifically, for the function $\theta(x_i)$ shown in FIG. 1A, more samples are needed in the center of the range [0,1) near the peak compared with the regions closer to zero or one.

Figure 1B:
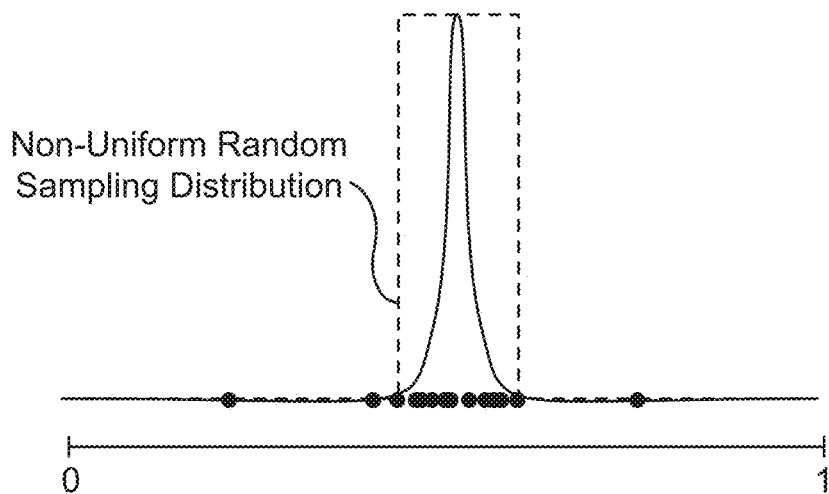
FIG. 1B illustrates a non-uniform randomly sampled function.

FIG. 1B illustrates a non-uniform randomly sampled function. A non-uniform random sampling distribution is used to sample the function so that more samples are selected in the "important" regions of the function. To most accurately integrate the function $\theta(x_i)$, a sampling function should have a distribution that matches the function $f(x_i)$, such as the non-uniform random sampling distribution. The non-uniform random sampling distribution may be a probability density function (PDF), p(x) that is used to perform importance sampling. Equation (1) is modified to account for the non-uniform distribution of the N samples:

$$\int f(x)dx = E\left[\frac{1}{N}\sum_{i=1}^{N}\frac{f(x_i)}{p(x_i)}\right] \quad x_i \sim p(x) \qquad \text{Eq (2)}$$

Dividing by the distribution probability for each value accounts for the increased number of samples in highly sampled regions. While the estimate produced using importance sampling is an approximation, it is more accurate compared with using the uniform random sampling distribution shown in FIG. 1A. When uniform or importance sampling is used for rendering images, the variance manifests as noise.

Figure 1C:
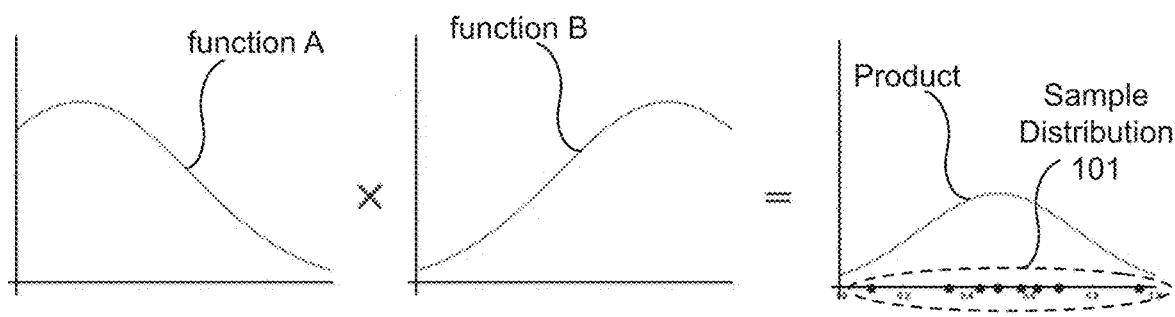
FIG. 1C illustrates importance sampling of a product function.

FIG. 1C illustrates importance sampling of a function that is the product of functions A and B. Multiplying the functions A and B produces the product function. In the context of the following description a product is a function that includes multiple functions, factors, expressions, or terms that are multiplied together to compute the product. A sample distribution 101 may be used to approximate the integral of the product using importance sampling. The sample distribution 101 includes more samples near the peak of the product where the product has the highest values and fewer samples where the values are lowest. The density of the sample distribution 101 closely matches the shape of the product, thereby reducing variance compared with using a uniform random sample distribution.

Figure 1D:
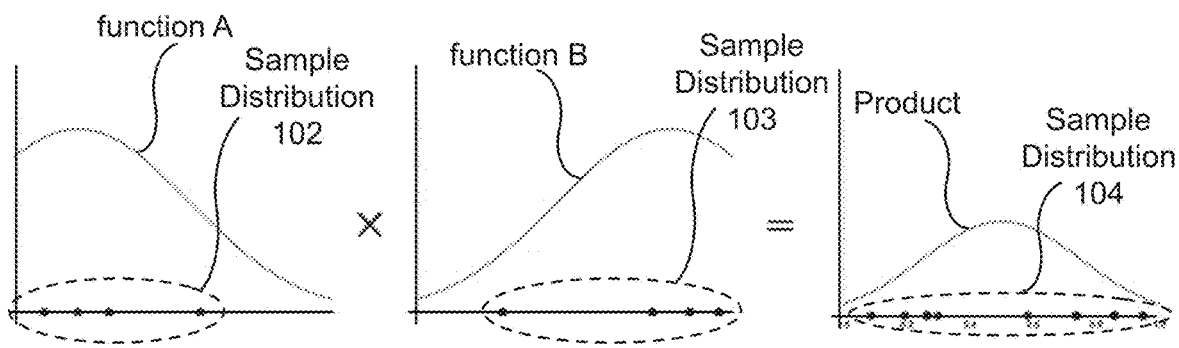
FIG. 1D illustrates importance sampling for product factors and resulting sample distribution for the product function.

FIG. 1D illustrates importance sampling for functions and resulting sample distribution for the product function. A sample distribution 102 is an importance sampling distribution for approximating an integral of function A. A sample distribution 103 is an importance sampling distribution for approximating an integral of function B. The densities of the sample distributions 102 and 103 closely match the shape of functions A and B, respectively, providing accurate approximations for the integrals of A and B. The combined sample distributions 102 and 103 produce a sample distribution 104 representing the distribution of the estimated integral for the product. The estimated integral of the product is computed by estimating functions A and B according to the sample distributions 102 and 103, respectively, and multiplying the estimates. Because the combined sample distributions, namely sample distribution 104 is a poor match for the shape of the product, the estimated integral of the product will have higher variance compared with using the sample distribution 101.

As shown in FIG. 1D, Monte Carlo importance sampling does not provide an accurate estimate for all functions. As described further herein, a sample distribution for estimating factors may be determined that, when combined, more closely matches the sample distribution for the product of the factors. The technique may be used, for example, to determine sample distributions for the functions A and B that, when combined, are similar to sample distribution 101, thereby enabling importance sampling for more accurate estimates.

Specifically, an improved Monte Carlo importance sampling technique for integrands composed of products may be applied to computer graphics rendering where direct sampling is often difficult in practice. For ray-tracing, paths are traced from a light source to a camera (e.g., viewpoint). When a ray included in the path intersects or hits a surface in a scene, the ray is redirected or reflected in a direction outward from the surface. Importance sampling may be used to choose the direction of the ray by sampling a hemisphere oriented around the surface normal located at the intersection. A bi-directional scattering distribution function (BSDF) may define how the light is scattered by the surface. The BSDF is included in the rendering equation as one factor of a product that is integrated. The improved Monte Carlo importance sampling technique may be used to estimate the BSDF and one or more other factors in the rendering equation to improve the quality of ray-traced images.

More illustrative information will now be set forth regarding various optional architectures and features with which product sampling may be implemented using a composition of warps, per the desires of the user. It should be strongly noted that the following information is set forth for illustrative purposes and should not be construed as limiting in any manner. Any of the following features may be optionally incorporated with or without the exclusion of other features described.

Figure 1E:
FIG. 1E illustrates an image, including a region that is ray-traced using mapped uniform samples.
Figure 1E:
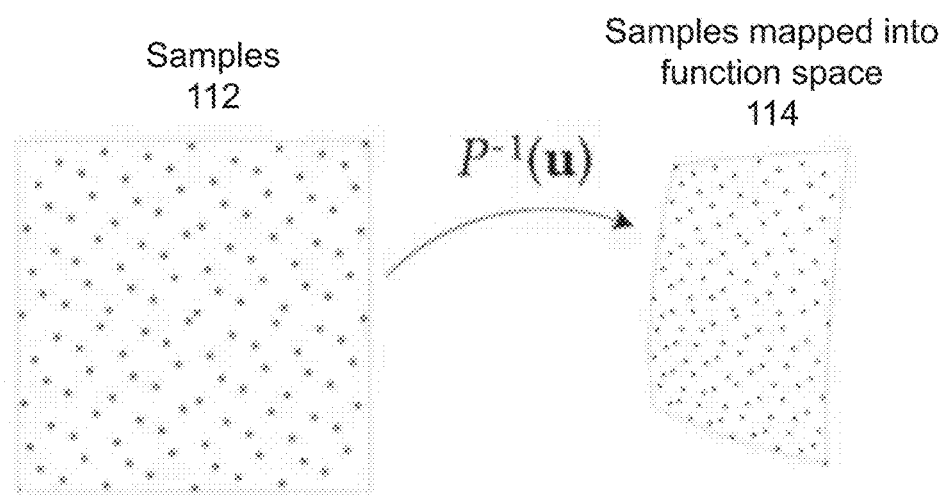

FIG. 1E illustrates an image 115, including a region 110 that is ray-traced using mapped uniformly distributed samples. Each pixel may be generated using a set of uniform (e.g., uniformly distributed) samples 112 in a primary sample space (PSS). As shown in FIG. 1E, the PSS for a pixel is the two-dimensional unit square $[0,1)^2$ that includes the set of uniform samples 112. Note that the samples are not randomly distributed within the PSS, but the samples are uniformly distributed within the PSS according to a uniform probability density function. Similarly, non-uniform samples are samples that are distributed according to a non-uniform PDF.

The set of uniform samples 112 is mapped from PSS into an n-dimensional manifold $\mathcal{D}$ (e.g., the surface of a shape or a BSDF) using a mapping $[0,1)^n \to \mathcal{D}$, where $\mathcal{D}$ is referred to as function space. The mapping produces samples mapped into function space 114. The image region 110 is rendered using the uniform samples mapped into function space 114. Other regions of the image 115 are rendered using the same or other uniform samples similarly mapped into function space.

Given a PDF p(x), a mapping from PSS to function space can be found through inverse transform sampling, where p is written as the product of 1-dimensional PDFs and the cumulative distribution functions (CDFs) of each 1-dimensional PDF are derived and subsequently inverted. This approach allows the use of stratified and low-discrepancy PSS points, which generally reduces error. However, for many quantities of interest in rendering it is not possible to compute the closed form of one or more of the PDF, the 1-dimensional CDFs or the inverses of the 1-dimensional CDFs. Functions for which a closed form cannot be computed may be approximated using importance sampling, such as the Monte Carlo importance sampling technique using a composition of warps, as described further herein.

The disclosed technique will be explained in the context of a rendering application, and, more specifically, within the context of a ray-tracing algorithm that computes a direct lighting integral. It will be appreciated that the technique is not limited to this specific application and can be implemented to estimate other integrals of product functions. The direct lighting integral used to render images is a product of three factor functions that are integrated over a hemisphere that represents ray direction relative to a location on a surface. The direct lighting integral computes a color at a point, as defined by:

$$\int_{S^2} f_r(\omega_i \rightarrow \omega_o) L_i(\omega_i) |\cos \theta_i| d\omega_i \qquad \text{Eq (3)}$$

A first factor accounts for the material (BSDF) at the point, a second factor is the amount of light illuminating the point from the direction $\omega_i$, and a third factor is the cosine term that attenuates the other factors by the cosine of the light incident direction and the surface normal. When Monte Carlo importance sampling is used to compute the direct lighting integral, variance appears as noise in the ray-traced images. The number of samples N taken for each point may be increased to reduce the noise.

Often, important terms in the function being integrated cannot practically be included in the sampling distributions. For example, there is no known analytic technique for uniformly sampling cosine-weighted triangle primitives of a spherical surface. The cosine term may vary significantly over the surface of a triangle. In turn, the variation of the cosine term leads to increased variance in Monte Carlo estimates of integrals that include the cosine term, since it is not accounted for in the importance sampling distribution. The missing factors g(x) in PSS are expressed as:

$$g_{PSS}(u) := \frac{g(x)}{p(x)} = \frac{g(P^{-1}(u))}{p(P^{-1}(u))}. \qquad \text{Eq (4)}$$

The missing factors may be included, to some extent, by modifying the importance sampling distribution based on $g_{PSS}$. As described further herein, a warp function may be applied in PSS to modify the importance sampling distribution and reduce variance.

Figure 1F:
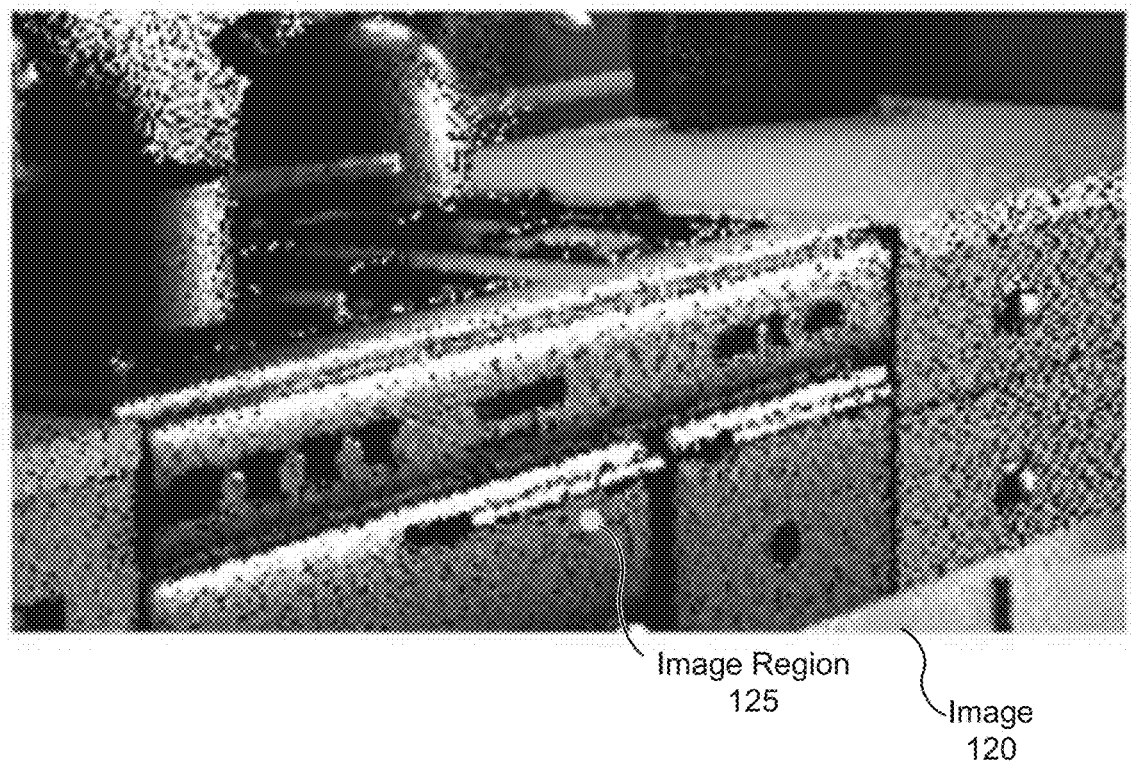
FIG. 1F illustrates an image, including a region that is ray-traced using mapped warped uniform samples, in accordance with an embodiment.
Figure 1F:
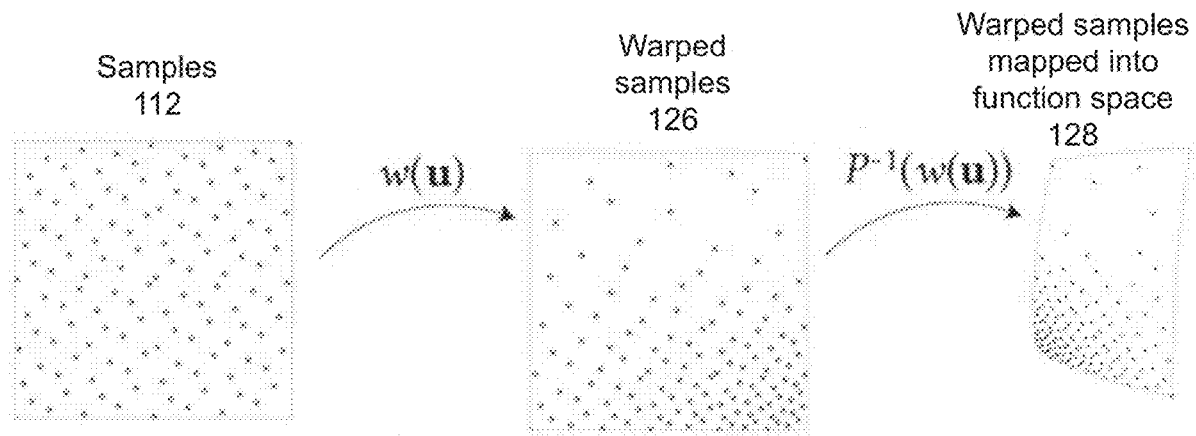

FIG. 1F illustrates an image 120, including a region 125 that is ray-traced using mapped warped uniform samples, in accordance with an embodiment. The amount of noise in the image 120 is reduced compared with the noise in the image 115 shown in FIG. 1E. Thus, the variance for the Monte Carlo estimate is also reduced for the image 120 compared with the image 115. Instead of directly mapping the set of samples 112 in the PSS into the function space, the set of samples 112 is warped within the PSS before the mapping operation.

An inverse CDF, $Q(x)=P^{-1}(x)$, which is a 1-dimensional warp, is called a quantile function in statistics. "Warp" describes the process of displacing uniform random samples non-uniformly to achieve a desired probability distribution; a warp distributes points according to its associated probability density, clumping or stretching uniformly distributed points without changing the relative order of the points. The relevant terminology is summarized in Table 1 below.

TABLE 1

| Symbol | Definition |
| --- | --- |
| u | Uniform n-dimensional PSS point in $[0, 1)^n$. |
| $\mathcal{D}$ | General n-dimensional domain. |
| x | Point in $\mathcal{D}$. |

TABLE 1-continued

| Symbol | Definition |
| --- | --- |
| p(x) | Probability density function (PDF). |
| P(x) | Probability measure. In 1D, the cumulative distribution function (CDF). |
| w(x) | Warp: a bijection from $\mathbb{R}^n$ to itself used to warp samples x. |
| $J_w$ | Reciprocal of the absolute determinant of the Jacobian matrix, $|\det (\partial w_i(x)/\partial x^T)|^{-1}$, of a warp w. |

A warping function w(u) is fitted in the PSS to have an inverse Jacobian determinant $J_w(u)$ that approximates the distribution of $g_{PSS}(u)$. The warping function is applied to the set of uniform samples 112 to produce a set of warped samples 126 having a non-uniform distribution in the PSS. Warping the set of uniform samples 112 before transforming by $P^{-1}$, produces a resulting sample distribution that approximates the desired sample distribution that includes the missing factors and reduces variance. The distribution of warped samples mapped into function space 128 reduces variance compared with the samples mapped into function space 114 shown in FIG. 1E.

If the warp is exact, meaning $J_w(u) \propto g_{PSS}(u)$, then the resulting distribution is exactly equal to the desired distribution for approximating a factor of the product, such as one of the factors in Equation (3). While exact warps are not generally possible, approximate warps can approach the desired distribution, significantly reduce error, and add only limited computational cost. Some existing warps that may be used to fit one or more factors and reduce variance of a product integral sampling include bilinear, biquadratic Bézier, and windowed separable Cauchy functions. These warping functions are efficient, have straightforward implementations, and incorporate easily into existing rendering systems. Variance reductions of up to 6× may be achieved using warp functions for a number of rendering problems with minimal increase in runtime.

Additionally, multiple factors in the product integral can be accounted for by composing warps $w_i(\ldots w_2(w_1(u)))$. For example, when inverse transform sampling produced a warp $Q(x)=W(Z(x))$, the two warps W and Z may be applied in series as a composition such that $W(Z(x)) \equiv (W \bullet Z)(x)$. Because the warp is used for importance sampling, it always maintains an unbiased Monte Carlo estimator.

Evaluating the PDF of Composed Warps

In the context of the following description, a warp is defined as a continuous, bijective mapping—on the probability density of n-dimensional points $x \in \mathbb{R}^n$ that are distributed according to the probability density $p(x)$. In other words, the probability density $p(x)$ is expressed in terms of a warp, where $x'=w(x)$. A composite warp is defined as $w=w_m \bullet \ldots \bullet w_1$. By the chain rule, the Jacobian matrix of the composition of m warps is the product of the Jacobian matrices of the individual warps. Because uniform samples in the PSS are used (i.e., p(x)=1), the absolute value of the Jacobian determinant is itself the PDF of the warped samples:

$$p_w(x'^m) = \Pi_{i=1}^m J_{w_i}(x^i) = J_w \qquad \text{Eq. (5)}$$

Existing sampling techniques that are based on the inversion method may be augmented using the PSS warps. Therefore, an existing sampling technique (e.g., BSDF sampling or uniform emitter sampling) is used to illustrate the augmented technique, assuming $x'=P_s^{-1}(x)$ with associated PDF $p_s(x)$. The last warp of the composite warp is set for the existing sampling technique, i.e. $w_m = P_s^{-1}$ and $J_{w_m} = p_s$. All earlier warps are the PSS warps that operate on $[0,1)^n$. As described below, the warps are fit so that the overall PDF $p_w(x^m)$ approximates the rendering integrand.

Given a set of warps $w_i$, the algorithm to generate warped samples and to compute their PDF is given in Algorithm 1 in Table 2 below. Note that the final PDF can easily be computed during sampling using the successive warped values of $x^i$ and the product of $J_{w_i}$ values.

TABLE 2

Algorithm 1: General sample warping algorithm. Given m warps wi. the warps are successively applied to the input PSS sample u. The final sample value $x \in D$ and its PDF are returned.

pdf ← 1
x ← u
for i ← 1 to m do
| x ← $w_i(x)$
| pdf ← pdf × $J_{w_i}(x)$
end
return x, pdf To compute the PDF for an arbitrary value $x \in \mathcal{D}$ (for example, for multiple importance sampling), the inverse warps $w_i^{-1}$ are applied to x in reverse order, with their Jacobian determinant values multiplied together along the way. This approach is shown in Algorithm 2 in Table 3 below.

TABLE 3

Algorithm 2: Algorithm to compute the PDF of a given value $x \in \mathcal{D}$. Note that the order in which the PSS warps are applied is reversed compared to their use for generating samples.

pdf ← 1
for i ← m to 1 do
| pdf ← pdf × $J_{w_i}(x)$
| x ← $w_i^{-1}(x)$
end
return pdf Note that in order to apply algorithm 2, it is necessary to be able to invert $w_m$. For sampling techniques based on the inversion method, the inverse of $w_m$ is in each dimension the 1-dimensional CDF corresponding to that dimension, which is derived along with the sampling algorithm. The inverses of sampling algorithms based on uniform area sampling of shapes are straightforward, but the inverse of some prior art sampling algorithms are not known.

The Monte Carlo estimator of the integral of a function $f$ using warped samples $f(x^m)/p_w(x^m)$ achieves minimal variance (the goal) when the PDF of the warped samples is proportional to $f$:

$$p_w(x^m) = \Pi_{i=1}^m J_{w_i}(x^i) \propto f(x^m) \qquad \text{Eq. (6)}$$

Consider the case of having one or more existing warps (e.g., $w_i = P_s^{-1}$ and possibly one or more PSS warps), an additional warp $w_i$ should be composed that is proportional to $f$. Simple algebra performed on Equation (6) yields the optimality condition on $w_i$:

$$J_{w_i}(x^i) \propto \frac{f(x^m)}{\Pi_{j \neq i} J_{w_j}(x^j)}. \qquad \text{Eq. (7)}$$

Thus, an additional i-th warp—which can be inserted into the chain of warps at any position i—can, theoretically, perfectly correct any remaining discrepancy w.r.t. $f$ by having the correct inverse Jacobian determinant.

Custom warp functions may be combined to provide a sample distribution that accurately approximates the factors of the product being integrated. Each warp function approximates an inversion function. In an embodiment, the warp functions are selected from a set of defined warp functions. The selected warp functions are then customized or "fitted" to implement importance sampling for the approximated product. In principle, an optimal product warp may be created using warp composition by finding a correction warp $w^2$ whose PDF is proportional to the ratio of the target product distribution and the product of probabilities (inverse Jacobian determinants) of the input PDFs.

Figure 2A:
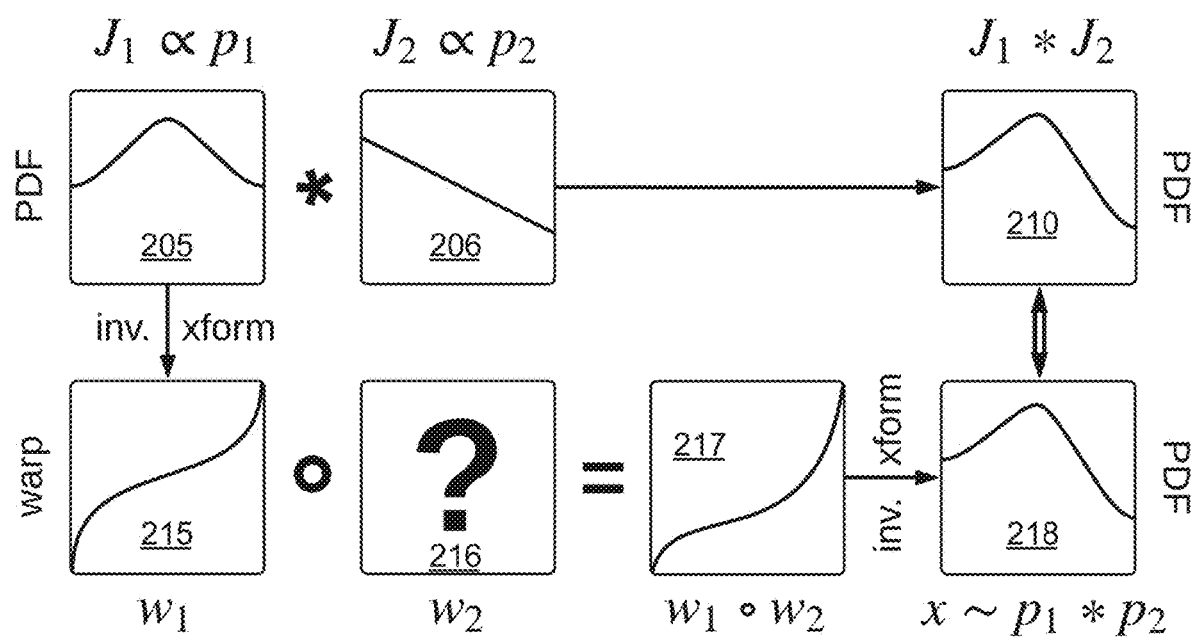
FIG. 2A illustrates warp composition to create an optimal product warp, in accordance with an embodiment.

FIG. 2A illustrates warp composition to create an optimal product warp, in accordance with an embodiment. A one-dimensional example is used to illustrate the process of fitting composed warps. Suppose that a product $f(x) = p_1(x) p_2(x)$ will be sampled, but $p_1(x) p_2(x)$ cannot be analytically inverted to find $P^{-1}$. To approximate $P^{-1}$, warps of the individual terms, $w$ 215 and $w_2$ 216, are composed, and a new distribution that approximates $p(x)$ is sampled from the composition of $w_1$ 215 and $w_2$ 216.

First and second probability distribution functions PDFs 205 and 206 ($p_1$ and $p_2$) are multiplied to produce the PDF 210. The PDF 205 is inversely transformed to produce a first warp ($w_1$) 215. The first warp 215 is the inverse of the integral for the PDF 205 and the PDF 205 is the inverse derivative of the first warp 215. The PDF 206 is the inverse derivative of the correction warp 216 ($w_2$). The challenge is to compute the correction warp 216 through fitting. An optimal product warp 217 is a composition of the first warp 215 and the correction warp 216. When inversely transformed, the optimal product warp 217 corresponds to the PDF 218 that, ideally, approximately equals the target PDF 210.

Fitting Warp Functions

There are two phases to fitting, the first phase is fitting for the purpose of constructing a single warp. Sampling the function and constructing a bilinear or biquadratic approximation from those samples is an example of the first phase fitting. The second phase of fitting is adjusting the fit parameters from the first phase to account for the other warps, if and when composing multiple warps.

During rendering, customized warping functions may be fitted from scratch at each point being shaded. Doing so eliminates the need to maintain additional data structures and avoids the complexity and computational expense of on-line learning during rendering; it is particularly well suited to highly-parallel architectures like GPUs. In turn, the warping functions should be able to be efficiently fit and evaluated. Time spent on fitting and evaluating warps could instead be used to take more samples without warping, so warping must be more efficient overall to be worthwhile.

To make fitting as simple as possible, the optimal inverse Jacobian determinant is directly approximated up to a constant factor (right-hand side of Equation 7), rather than attempting to derive a good warp in a single step. To perform the fit, simple parametric functions that admit closed-form integrals may be used. The simple parametric functions can be normalized and a valid approximate inverse Jacobian determinant may be obtained, as well as applying the inversion method to find a corresponding warp.

Warps may be fitted using several simple parametric functions a(x). The simplest parametric function, a bilinear function, is defined by 2×2 values $v_{\{0,1\}\times\{0,1\}}$ at the corners of the parametric domain. The biquadratic Bézier is more expressive; it uses 3×3 control points, but requires solving two cubic equations to apply the warp. The windowed Cauchy function allows placing a peak at a given point in $\mathbb{R}^2$, not necessarily within $[0,1)^2$.

After one of the approximation functions $a(x)$ is fitted to the RHS of Equation 7, the fitted function is normalized over $[0,1)^2$ to obtain the corresponding inverse Jacobian determinant $J_w$. In one dimension, given $J_w$, the warp can be found using the inversion method: integrate $J_w$ and then invert the result. For a multi-dimensional warp, an infinite number of warps can have $J_w$. In that case, only a single valid warp is needed, which can be derived by marginalizing over all of the dimensions except one and applying the inversion method to find a one dimensional warp in the dimension. After applying the newfound warp along the chosen dimension, the warp over the remaining dimensions can be found recursively by the same approach, ignoring all previously warped dimensions, until all dimensions have been warped.

Attempting to accurately approximate the entire right-hand side of Equation 7 with a single warp is often futile. In fact, it can be counterproductive, because smooth parametric functions can overfit to high-frequency variation of Equation 7 that may only be present in some of the factors. For example, in light-transport, the visibility term of $f$ may be high-frequency and discontinuous, whereas the foreshortening term is a smooth low-frequency cosine.

Fortunately, a simple workaround largely avoids problematic overfitting. A number of well-behaved factors of $f$ may be selected—such as the BSDF and the foreshortening term (but not the visibility term)—and one warp is fitted to each of the factors. With this technique, ignoring the neglected factors, if all warps are perfectly fit to their corresponding factors, proportionality to the target distribution (RHS of Equation 7) is achieved, and thus zero variance is a result. Additionally, when some warps are sub-optimally fit, their residual errors, which potentially contain high frequencies, do not hinder the ability to fit functions to the other warps. In the following, $f$ represents either the right hand side of Equation 7, or some approximation of the right hand side of Equation 7 that neglects individual factors.

It is possible to fit the inverse Jacobian determinants starting from the PSS of $w_i$ or starting from the integration domain. Both ways can be effective, depending on the warp being fit. The bilinear and biquadratic warps may be fit point-wise starting from $w_i$'s PSS: for the warp parameters $v$, take $x^i=v$, compute the corresponding $x^m$, and evaluate $f$.

$$\hat{f}(x^m) = \hat{f}((w_m \bullet \ldots \bullet w_{i+1})(x^i)) \qquad \text{Eq. (8)}$$

Note that the parametric warp functions $a(x)$ leave the corners of $[0,1)^2$ in place: thus, the bilinear approximation function can be fit at the corners while ignoring all subsequent warps besides $w_m$.

For the Cauchy warp, it can be more effective to fit working backward from $x_m$. For example, if the peak of $\hat{f}$ is known to be at $x_m$, and the corresponding point $x^i = (w_{i+1}^{-1} \bullet \ldots w_m^{-1})(x^m)$ can be found for placement of the peak of the Cauchy warp $\mu$.

Given the peak of the Cauchy distribution, the $\sigma_i$ parameters may be fitted considering each dimension independently. In a single dimension, for the Cauchy distribution to be proportional to a peak value $a$ and be proportional to a value $b$ a distance $d$ from the peak, then $\sigma$ is:

$$\sigma = \frac{d\sqrt{b}}{\sqrt{a-b}}. \qquad \text{Eq. (9)}$$

Therefore, $\hat{f}$ is evaluated at one or more additional PSS points offset from $\mu$ in each dimension and Equation (9) is applied, taking the maximum $\sigma$ when multiple points are used.

Figure 2B:
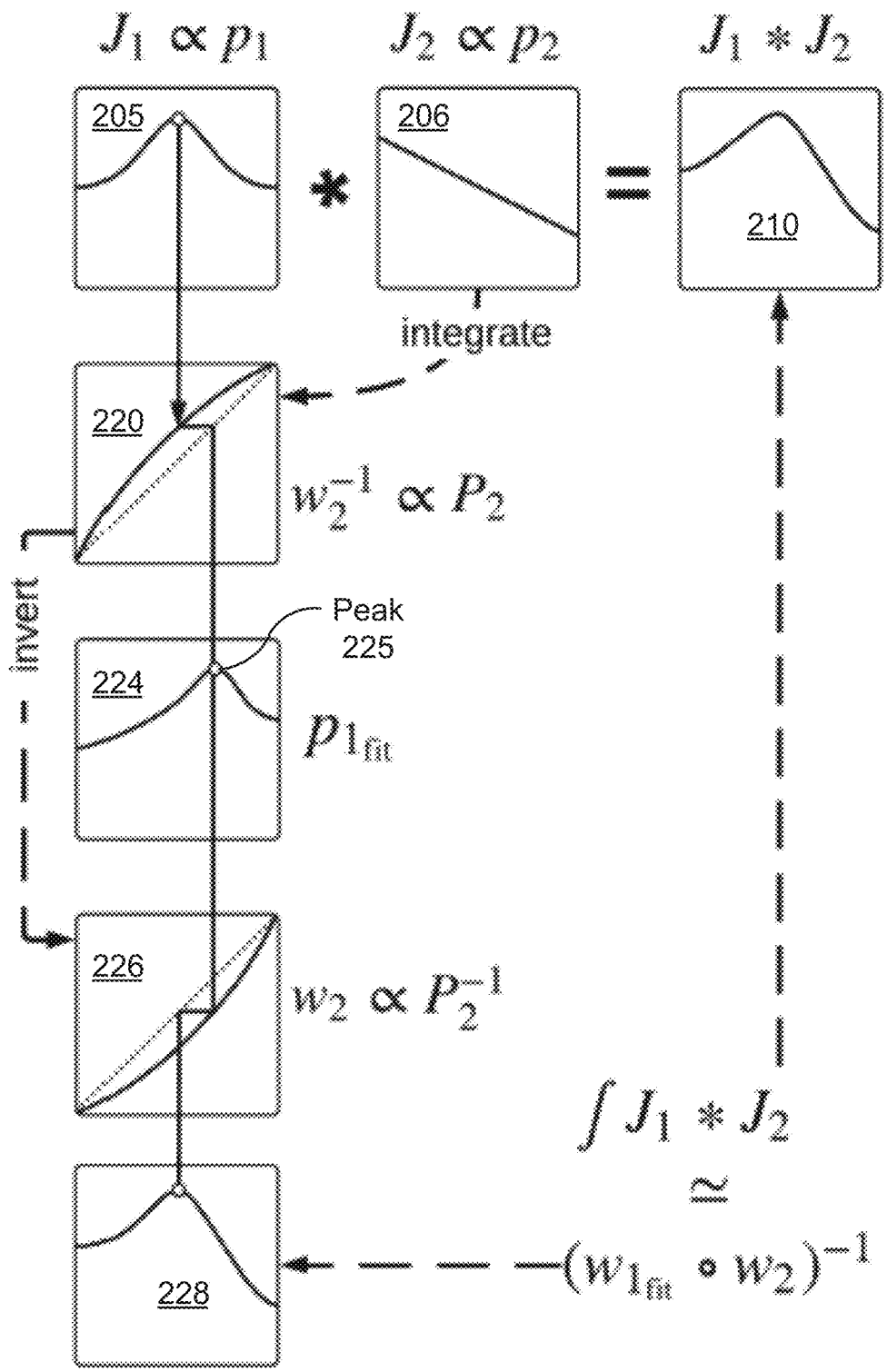
FIG. 2B illustrates fitting composed warps, in accordance with an embodiment.

FIG. 2B illustrates fitting composed warps, in accordance with an embodiment. As previously explained in conjunction with FIG. 2A, a product $f(x) = p_1(x) \, p_2(x)$ will be sampled, but $p_1(x) \, p_2(x)$ cannot be analytically inverted to find $P^{-1}$. To approximate $P^{-1}$, warps of the individual terms, $w_1$ and $w_2$, are composed, and a new distribution that approximates $p(x)$ is sampled from the composition of $w_1$ and $w_2$.

As shown in FIG. 2B, the peak of the $p_1(x)$ 205 term will be biased (shifted) to the left when the second term is applied. Therefore, for the composition of warps, the warp $w_2$ for second factor $p_2(x)$ is applied first, so that the sample distribution is denser on the left compared with the right and when the warp $w_1$ for the first factor $p_1(x)$ 205 is applied, the sample distribution will be biased to the left and will not match the product PDF 210. In this case, to make sure the peak of the $p_1(x)$ 205 term ends up in the correct place, a replacement for $p_1(x)$ 205 is used that is called $p_{1fit}(x)$ 224 having a peak 225. A warp $w_{1fit}$ for $p_{1fit}(x)$ 224 replaces the warp $w_1$ in the composition of warps. To correct for the biasing and compute $p_{1fit}(x)$ 224, an inverse warp for the second factor, inverse warp $w_2^{-1}$ 220, is applied to the peak in the first factor 205. In other words, the sampling function for the first term should account for the distribution of the second term. Therefore, the composed warp, $w_{1fit} \bullet w_2$, produces a more accurate result compared with the composed warp $w_1 \bullet w_2$.

The PDF 206 is integrated to produce the inverse warp $w_2^{-1}$ 220. $P_2$ is the CDF of the $p_2(x)$ term—the inverse warp $w_2^{-1}$ 220 corresponding to the distribution $P_2(x)$. The $p_{1fit}(x)$ 224 has a center at $\mu_{fit} = P_2(\mu)$, where $\mu$ is the parameter of the peak of the Cauchy term $p_1(x)$ and $P_2$ is the CDF of the linear term $p_2(x)$. $P_2$ is the inverse warp $w_2^{-1}$ 220 corresponding to the distribution $P_2(x)$.

In order to fit the width of the peak 225 for $p_{1fit}$, $J_2(\mu)$—the inverse Jacobian determinant of $P_2(\mu)$ is evaluated. Alternatively, as long as $p_2$ is a normalized PDF, $p_2(\mu)$ may be evaluated directly to fit the width. Fitting the width of the peak 225 reveals how much the distribution has been squeezed or stretched after going through the warp $w_2 \propto (P_2^{-1}$, and it is possible to compensate by stretching or squeezing the fit distribution's peak 225 by a reciprocal amount. Alternatively, one could map points on either side of $\mu$ through $P_2$ and then compute their difference.

As illustrated by the composition of $w_1$ and $w_2$, compared with the composition $w_{1fit}$ and $w_2$ when the importance sampling distribution for one factor is a poor match for the other factors, the results may have high variance. In practice, perfectly correcting all discrepancy is usually impossible, but fitting each warp included in a composition of warps according to subsequent warps in the composition may reduce discrepancies significantly. For example, if pre-existing warps cover some factors of $f$ such as the BSDF in the rendering equation, then additional warps can be introduced for the remaining factors—for example the foreshortening term. Each warp is fitted by adjusting parameters that are specific to the warp function. The parameters are used to fit 2D functions a(x), such as the bilinear, biquadratic Bézier, and windowed separable Cauchy warp functions listed in Table 4.

TABLE 4

| | a(x) | Parameters |
|---|---|---|
| Bilinear | $g(x_1, g(x_2, v_{0,0}, v_{1,0}),$ $g(x_2, v_{0,1}, v_{1,1}))$, with $g(x,a,b) = (1 - x)a + xb$. | $v_{i,j}$ |
| Biquadratic Bézier | $b(x_1, b(x_2, v_{0,0}, v_{1,0}, v_{2,0}),$ $b(x_2, v_{0,1}, v_{1,1}, v_{2,1}),$ $b(x_2, v_{0,2}, v_{1,2}, v_{2,2}))$, with $b(x, a, b, c) =$ $(1 - x)^2 a + 2(1- x)xb + x^2 c$. | $v_{i,j}$ |
| Windowed separable Cauchy | $c(x_1)c(x_2)$, with $c(x_i) = \dfrac{1}{\pi \gamma_i [1 + ((u_i - \mu_i)/\gamma i)^2]}$ | $y_i$ and $\mu_i$ |

The PSS warps may be applied to three problems related to direct lighting: cosine-weighted solid angle sampling of light sources, uniform area sampling of bilinear patches, and sampling the product of BSDFs and light sources. When estimating direct illumination from emissive geometry with Monte Carlo integration, it is more efficient to uniformly sample the solid angle subtended by the emitter than to uniformly sample its surface area. Doing so eliminates variation in the integrand due to the inverse squared distance factor and the cosine between the light's normal vector and the outgoing light direction, which in turn reduces variance.

Even better is to also incorporate the cosine of the incident direction at the shading point into the light sampling distribution. The PSS warps may be applied to incorporate the additional cosine factor, transforming it into PSS and fitting a warp to approximate the cosine factor. In an embodiment, warp cosine-weighted solid angle sampling gives a reduction of mean squared error (MSE) of as much as 2.88× compared to uniform solid angle sampling, with a minimal increase in runtime.

Warping functions are applied to the primary samples in $[0,1)^n$, where each warp approximates sampling a single factor of the product distribution. The key insight is that individual factors are often well-behaved and inexpensive to sample in primary sample space—even through the distortion of existing warps that sample other factors—which leads to a practical, efficient sampling algorithm. The sampling approach is unbiased, easy to implement, and compatible with multiple importance sampling. The warp may be used for projected solid angle sampling of spherical surfaces composed of triangles and quadrilaterals, to equi-area and projected solid angle sampling of bilinear patches, and to product sampling of glossy BSDFs and area light sources. For some real-world scenes, efficiency improvements of over 1.6× may be obtained.

Figure 2C:
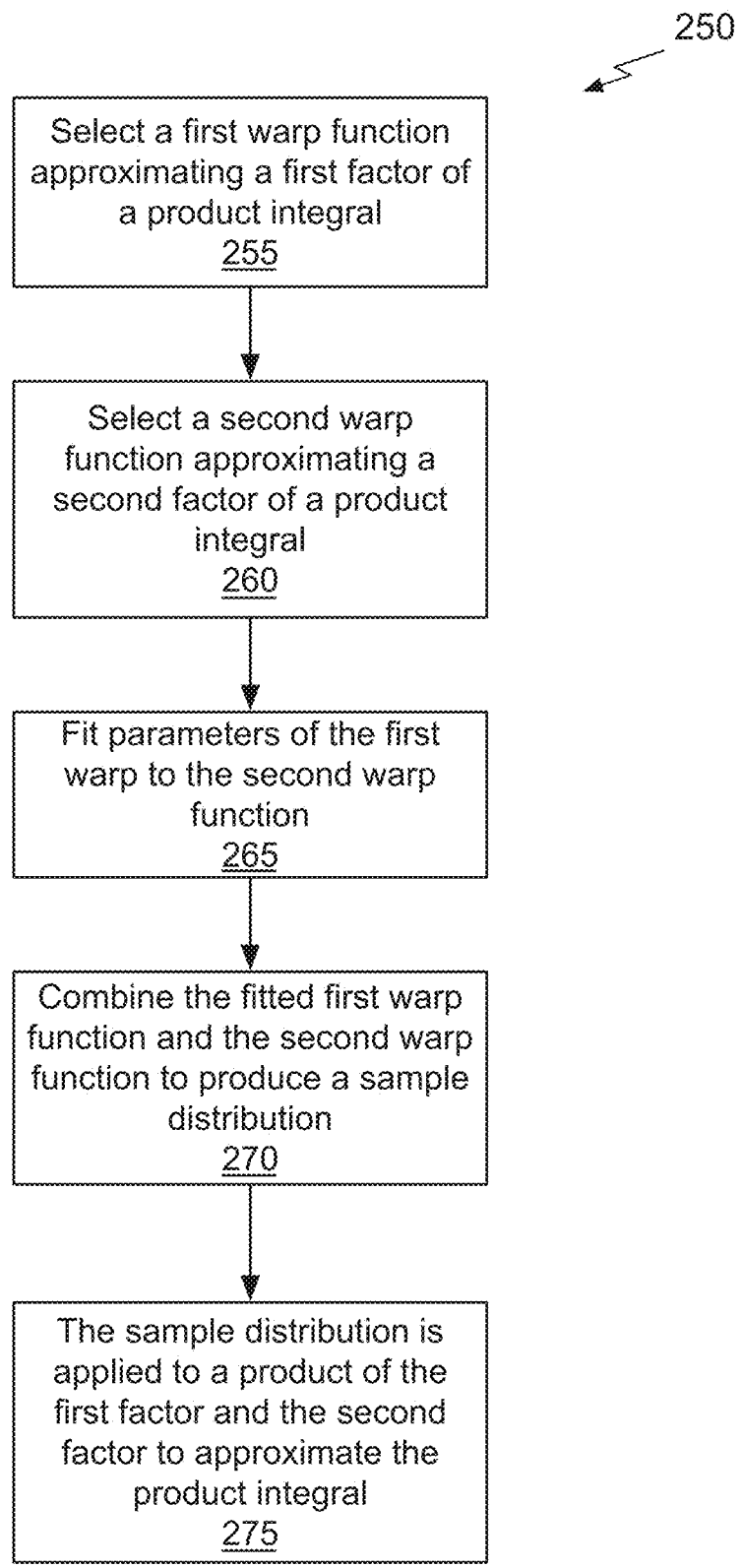
FIG. 2C illustrates a flowchart of a method for estimating a product integral using a composition of warps, in accordance with an embodiment.

FIG. 2C illustrates a flowchart of a method 250 for using a composition of warps to sample a product, in accordance with an embodiment. Although method 250 is described in the context of a processing unit, the method 250 may also be performed by a program, custom circuitry, or by a combination of custom circuitry and a program. For example, the method 250 may be executed by a GPU (graphics processing unit), CPU (central processing unit), or any processor capable of sampling a product using at least one warp, such as the parallel processing unit 300. Furthermore, persons of ordinary skill in the art will understand that any system that performs method 250 is within the scope and spirit of embodiments of the present disclosure.

At step 255 a first warp function is selected that approximates a first factor of a product integral. In an embodiment, the first warp function is an inverted probability or quantile function. In an embodiment the product integral is the direct lighting Equation (3). At step 260, a second warp function is selected that approximates a second factor of the product integral. At step 265, parameters of the first warp function are fitted to the second warp function. At step 270, the fitted first warp function and the second warp function are combined produce a sample distribution. In an embodiment, the fitted first warp function and the second warp function are combined as a composition of warps. At step 275, the sample distribution is applied to a product of the first factor and the second factor to approximate the product integral.

Using a composition of warps to compute a sampling distribution may be used to accurately approximate product integrals, where each warp corresponds to at least one factor in the product. The sampling distribution is compatible with existing techniques that rely on multiple importance sampling. Using fitting parameters of existing warp functions that each have known inverse Jacobian determinants and inverse warps may enable real-time execution to produce accurate approximations of the product integrals. Specifically, using the composition of warps may improve the efficiency of ray tracing techniques for producing realistic scenes, e.g., scenes that make use of area lights, complex materials, global illumination, etc.

Parallel Processing Architecture

Figure 3:
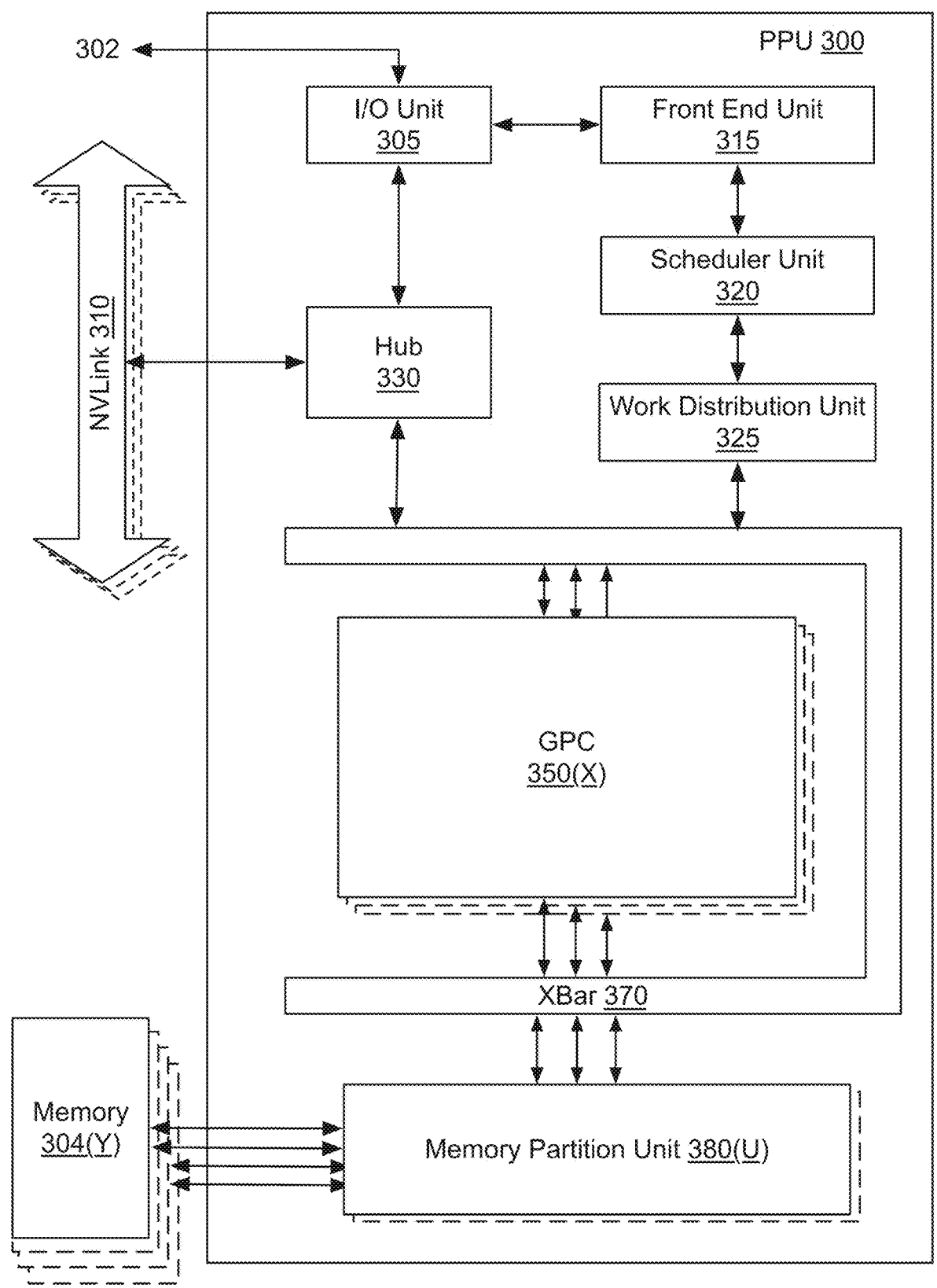
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a thread set. In an embodiment, a thread set comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
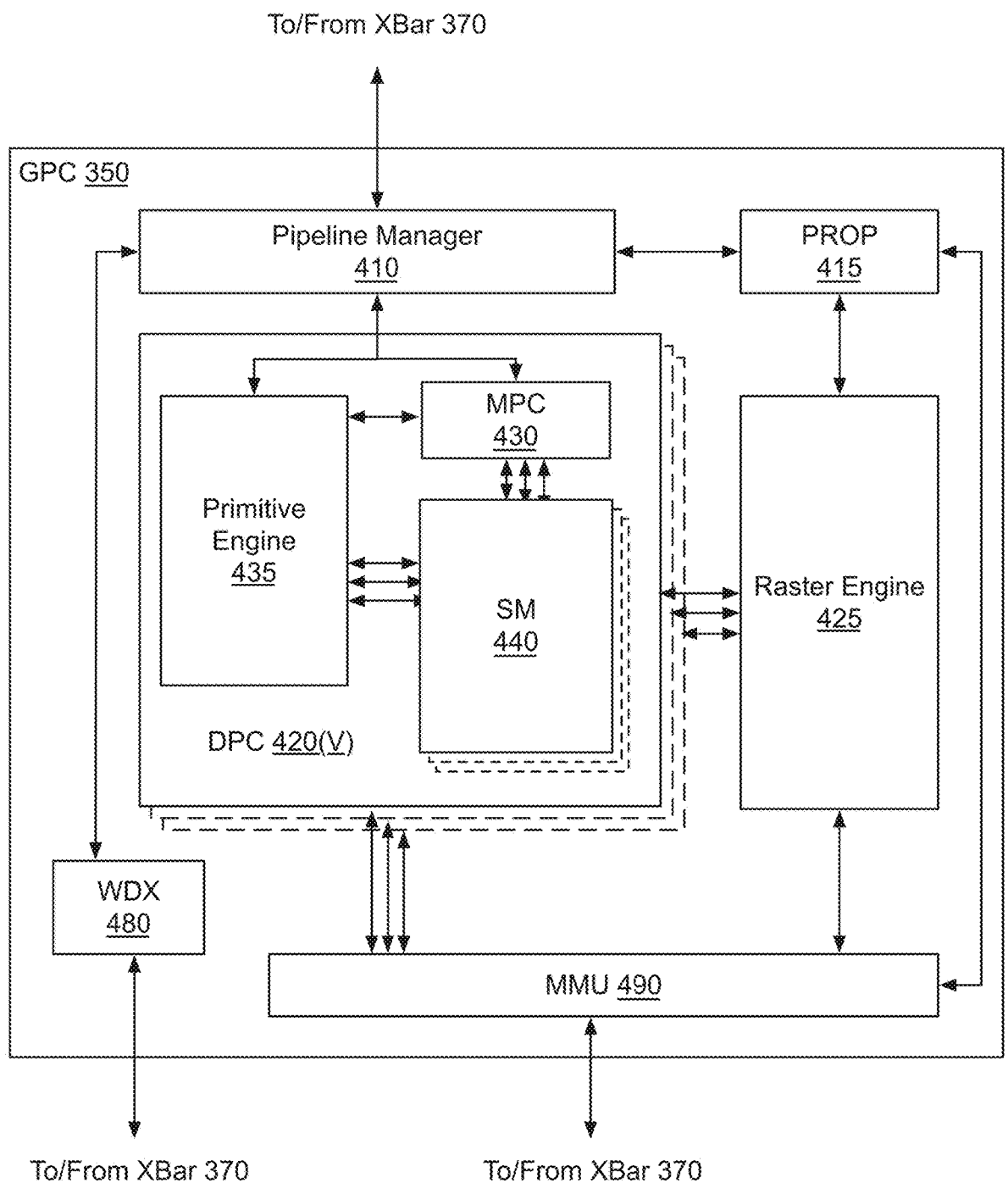
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
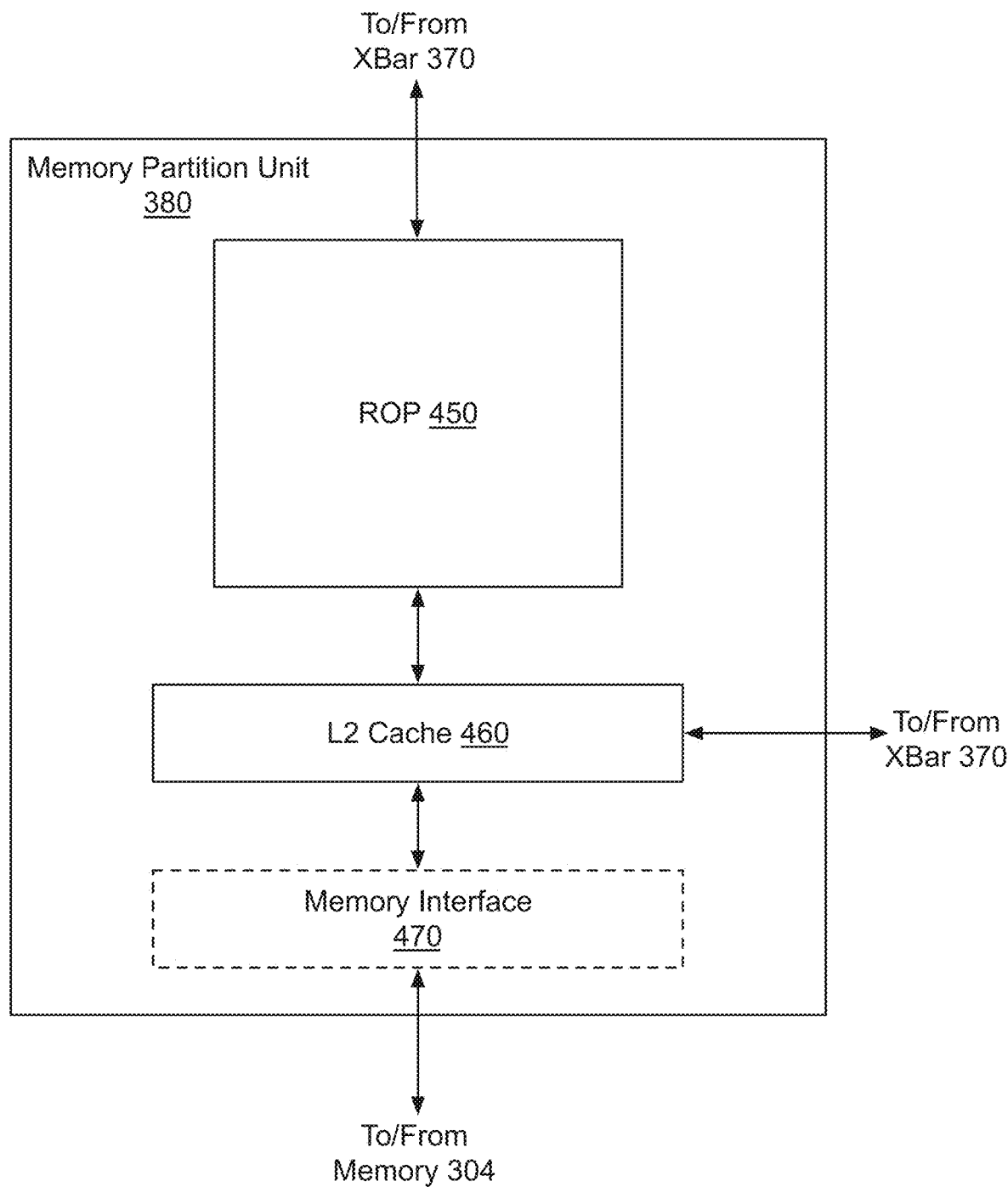
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a thread set) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each thread set, enabling concurrency between thread sets and serial execution within thread sets when threads within the thread set diverge. In another embodiment, a program counter, call stack, and execution state is maintained for each individual thread, enabling equal concurrency between all threads, within and between thread sets. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
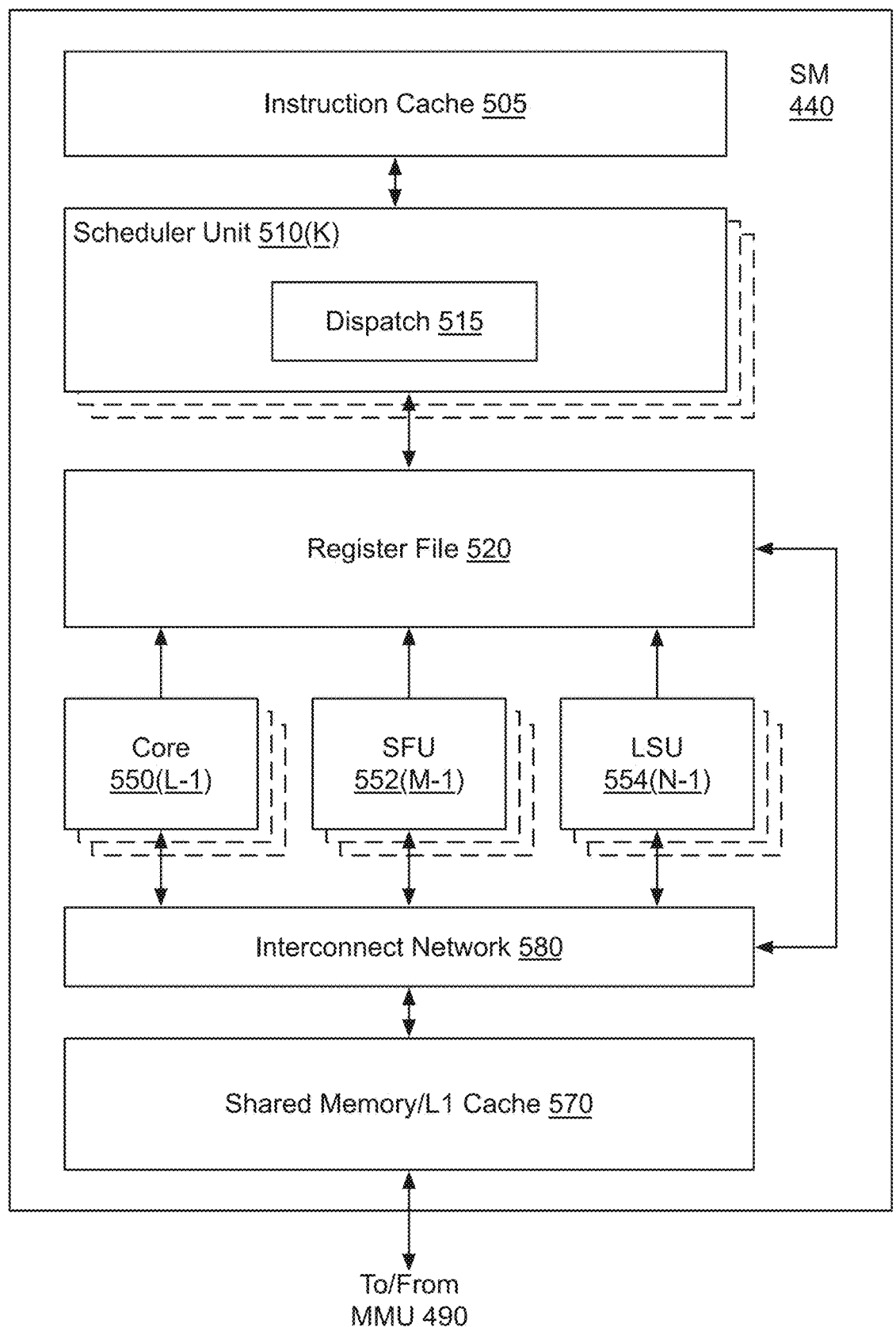
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as thread sets of parallel threads, where each thread block is allocated at least one thread set. In an embodiment, each thread set executes 32 threads. The scheduler unit 510 may manage a plurality of different thread blocks, allocating the thread sets to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same thread set to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different thread sets being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the thread set-level interface assumes 16×16 size matrices spanning all 32 threads of the thread set.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
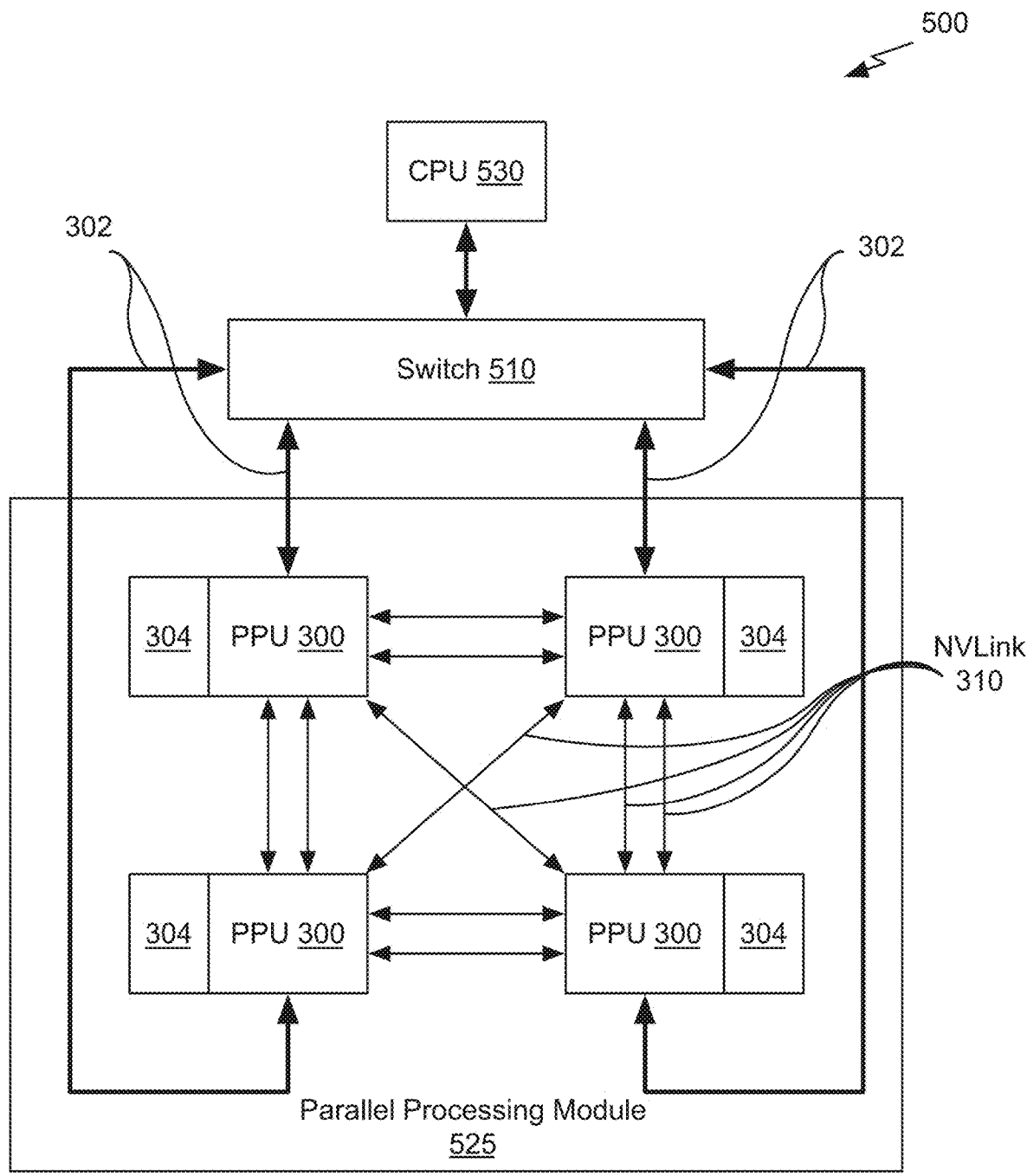
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 250 shown in FIG. 2C. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
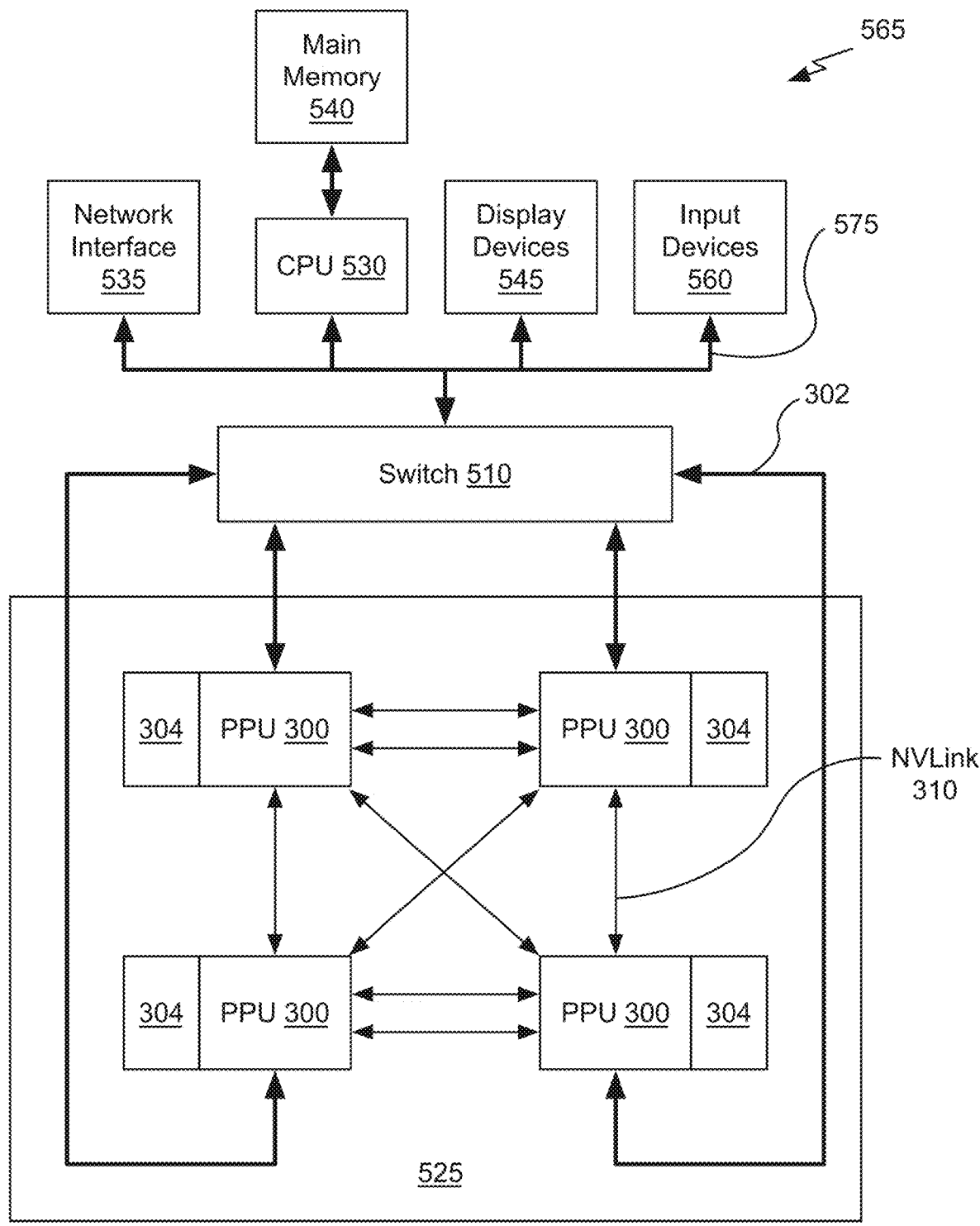
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 250 shown in FIG. 2C.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
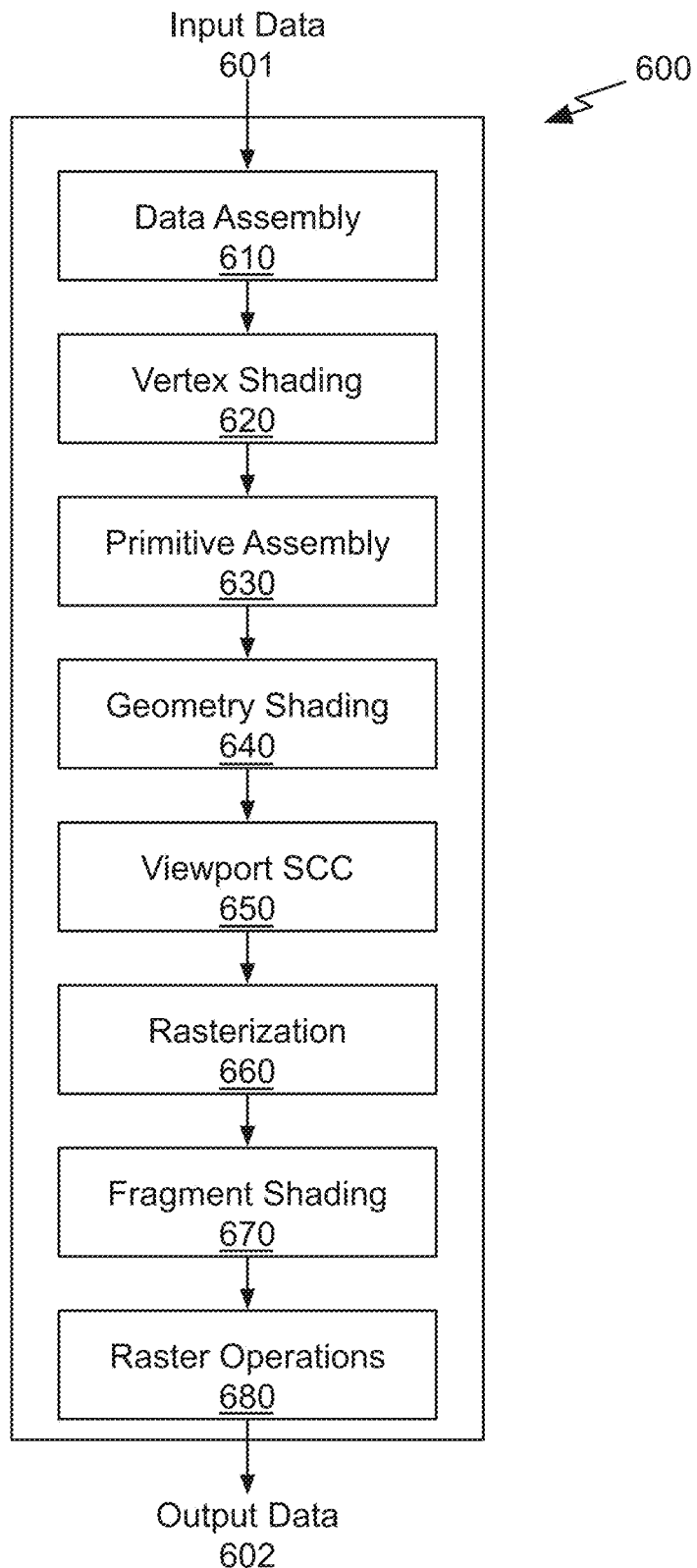
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 300) may also launch other kernels on the PPU 300 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 440.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
    selecting a first warp function approximating a first factor of a product integral;
    selecting a second warp function approximating a second factor of the product integral;
    fitting parameters of the first warp function to the second warp function to produce a fitted first warp function;
    combining the fitted first warp function and the second warp function to produce a sample distribution; and
    applying the sample distribution to a product of the first factor and the second factor to approximate the product integral.

2. The computer-implemented method of claim 1, wherein combining the fitted first warp function and the second warp function comprises:
    computing a composition of the fitted first warp function and the second warp function; and
    computing an inverse derivative of the composition to generate the sample distribution.

3. The computer-implemented method of claim 2, wherein the fitted first warp function, the second warp function, and the composition are represented in primary sample space.

4. The computer-implemented method of claim 1, wherein the parameters include multiple samples of the first warp function.

5. The computer-implemented method of claim 1, wherein the parameters are a peak and a width of the first warp function.

6. The computer-implemented method of claim 1, wherein the first factor is a cosine function and the product integral is a direct lighting integral.

7. The computer-implemented method of claim 1, further comprising using the sample distribution to shade a pixel of an image.

8. The computer-implemented method of claim 1, further comprising using the sample distribution to sample a hemisphere oriented around a surface normal when shading a pixel of an image using ray-tracing.

9. The computer-implemented method of claim 1, wherein the first warp function and the second warp function are selected from a set of warp functions each having a probability density function that factorizes into 1-dimensional probability density functions with a defined cumulative density function and inverse cumulative density function.

10. The computer-implemented method of claim 9, wherein the set of warp functions includes bilinear, biquadratic Bézier, and windowed separable Cauchy functions.

11. The computer-implemented method of claim 1, wherein fitting parameters of the first warp function comprises applying an inverse of the second warp function to the parameters of the first warp function.

12. The computer-implemented method of claim 1, wherein the steps of selecting, selecting, fitting, combining, and applying are performed on a server or in a data center to generate an image, and the image is streamed to a user device.

13. The computer-implemented method of claim 1, wherein the steps of selecting, selecting, fitting, combining, and applying are performed to generate an image used for training, testing, or certifying a neural network employed in a machine, robot, or autonomous vehicle.

14. A system, comprising:
    a memory storing a first warp function and a second warp function; and
    a processor coupled to the memory and configured to:
        select the first warp function approximating a first factor of a product integral;
        select the second warp function approximating a second factor of the product integral;
        fit parameters of the first warp function to the second warp function to produce a fitted first warp function;
        combine the fitted first warp function and the second warp function to produce a sample distribution; and apply the sample distribution to a product of the first factor and the second factor to approximate the product integral.

15. The system of claim 14, wherein combining the fitted first warp function and the second warp function comprises:
   computing a composition of the fitted first warp function and the second warp function; and
   computing an inverse derivative of the composition to generate the sample distribution.

16. The system of claim 15, wherein the fitted first warp function, the second warp function, and the composition are represented in primary sample space.

17. The system of claim 14, wherein the parameters include multiple samples of the first warp function.

18. The system of claim 14, wherein the first warp function and the second warp function are selected from a set of warp functions each having a probability density function that factorizes into 1-dimensional probability density functions with a defined cumulative density function and inverse cumulative density function.

19. The system of claim 14, wherein fitting parameters of the first warp function comprises applying an inverse of the second warp function to the parameters of the first warp function.

20. A non-transitory computer-readable media storing computer instructions that, when executed by one or more processors, cause the one or more processors to perform the steps of:
   selecting a first warp function approximating a first factor of a product integral;
   selecting a second warp function approximating a second factor of the product integral;
   fitting parameters of the first warp function to the second warp function to produce a fitted first warp function;
   combining the fitted first warp function and the second warp function to produce a sample distribution; and
   applying the sample distribution to a product of the first factor and the second factor to approximate the product integral.

* * * * *